(12) United States Patent
Dias de Assuncao et al.

(10) Patent No.: US 8,983,816 B2
(45) Date of Patent: *Mar. 17, 2015

(54) EFFICIENT EVALUATION OF NETWORK ROBUSTNESS WITH A GRAPH

(75) Inventors: Marcos Dias de Assuncao, Sao Paulo (BR); Bruno D. Flach, Rio de Janeiro (BR); Maira A. de C. Gatti, Rio de Janeiro (BR); Rudy R. Harry Putra, Kanagawa-ken (JP); Takashi Imamichi, Kanagawa (JP); Marco Aurelio Stelmar Netto, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 444 days.

This patent is subject to a terminal disclaimer.

(21) Appl. No.: 13/526,030

(22) Filed: Jun. 18, 2012

(65) Prior Publication Data

US 2013/0338989 A1    Dec. 19, 2013

(51) Int. Cl.
G06G 7/48 (2006.01)
G06G 7/62 (2006.01)
G06G 7/60 (2006.01)
G06F 17/50 (2006.01)

(52) U.S. Cl.
CPC ........ G06F 17/5009 (2013.01); G06F 17/5018 (2013.01)
USPC .................................................. 703/6; 703/2

(58) Field of Classification Search
CPC ... G06F 17/509; G06F 21/577; G08G 1/0104; G08G 1/0112; G08G 1/0133; H04L 41/12; H04L 45/28; H04L 45/14; H04L 45/16; H04L 45/38; H04L 47/10; H04L 47/125; G01C 21/3492; G06K 9/4638; G06Q 10/08

USPC ........................................ 703/2, 6, 8, 9, 18, 22
See application file for complete search history.

(56) References Cited

U.S. PATENT DOCUMENTS

| | | | |
|---|---|---|---|
| 5,978,588 A | 11/1999 | Wallace | |
| 6,125,453 A * | 9/2000 | Wyss | 714/1 |
| 7,155,376 B2 * | 12/2006 | Yang et al. | 703/8 |
| 7,299,458 B2 | 11/2007 | Hammes | |

(Continued)

OTHER PUBLICATIONS

Jijkstra, E.W., A Note on Two Problems in Connexion with Graphs, Numerische Mathematik 1, 269-271, 1959.*

(Continued)

*Primary Examiner* — Kamini S Shah
*Assistant Examiner* — Scott S Cook
(74) *Attorney, Agent, or Firm* — Scully, Scott, Murphy & Presser, P.C.; Louis J. Percello, Esq.

(57) ABSTRACT

Likely disconnections or system-level-impact producing slowdown in a flow parameter in a network can be identified by annotating a graph representing the network with a weight to edges of a graph representing the network. The weight can be linearly or non-linearly proportional to the inverse of the severity of the impact, and/or linearly or non-linearly proportional to the inverse of the likelihood of disconnection. Minimal cut sets needed to generate a disconnection in the network are identified from the annotated network based on the weights on the edges. Subsets of each minimal cut set are generated and evaluated during a simulation. The subsets can correspond to almost isolated scenarios for the network. The scope of the simulations can be reduced by selecting the minimal cut sets employing the weight.

24 Claims, 4 Drawing Sheets

(56) References Cited

U.S. PATENT DOCUMENTS

| | | | | |
|---|---|---|---|---|
| 8,484,002 | B2* | 7/2013 | Yang et al. | 703/8 |
| 2002/0187770 | A1* | 12/2002 | Grover et al. | 455/403 |
| 2005/0257269 | A1* | 11/2005 | Chari et al. | 726/25 |
| 2006/0064690 | A1 | 3/2006 | Hamadi et al. | |
| 2006/0173696 | A1* | 8/2006 | Drew et al. | 705/1 |
| 2006/0291390 | A1* | 12/2006 | Zhang et al. | 370/235 |
| 2007/0052702 | A1* | 3/2007 | Trotta et al. | 345/419 |
| 2007/0052705 | A1* | 3/2007 | Oliveira et al. | 345/423 |
| 2007/0067845 | A1* | 3/2007 | Wiemer et al. | 726/25 |
| 2008/0089333 | A1* | 4/2008 | Kozat et al. | 370/390 |
| 2008/0218518 | A1* | 9/2008 | Zhou et al. | 345/440 |
| 2008/0225751 | A1* | 9/2008 | Kozat et al. | 370/254 |
| 2008/0300834 | A1* | 12/2008 | Wiemer et al. | 703/2 |
| 2009/0043486 | A1* | 2/2009 | Yang et al. | 701/117 |
| 2009/0252416 | A1* | 10/2009 | Komodakis et al. | 382/180 |
| 2009/0323539 | A1* | 12/2009 | Wang et al. | 370/248 |
| 2010/0145761 | A1* | 6/2010 | Park et al. | 705/9 |
| 2010/0332991 | A1* | 12/2010 | Banerjee et al. | 715/736 |
| 2011/0125472 | A1* | 5/2011 | Trotta et al. | 703/6 |
| 2011/0125473 | A1* | 5/2011 | Trotta et al. | 703/6 |
| 2013/0083701 | A1* | 4/2013 | Tomic et al. | 370/255 |
| 2013/0107790 | A1* | 5/2013 | Lee et al. | 370/312 |

OTHER PUBLICATIONS

Liu, Y., Trivedi, K.S., A General Framework for Network Survivability Quantification, 12th GI/ITG Conference on Measuring, Modeling and Evaluation of Computer and Communication Systems, 3rd Polish-German Teletraffic Symposium, 2004.*

Galtier, J., Laugier A., Pons, P., Algorithms to Evaluate the Reliability of a Network, IEEE 2005.*

Hentenryck, P.V., Bent, R., Coffrin, C., Strategic Planning for Disaster Recovery with Stochastic Last Mile Distribution, Dec. 24, 2010, Sixth International Conference on the Integration of AI and OR Techniques in Constraint Programming for Combinatorial Optimization Problems (CP-AI-OR'10).*

International Search Report and Written Opinion, dated Jun. 28, 2013, issued in International Application No. PCT/US13/38601.

Yeh, L.P. et al., "Efficient Algorithms for the Problems of Enumerating Cuts by Non-decreasing Weights." Algorithmica (Mar. 2010) pp. 297-312, vol. 56, No. 3.

Nagamochi, H. et al., "Computing All Small Cuts in an Undirected Network" Algorithms and Computation, Proceedings 5th International Symposium, ISAAC'94 Beijing, (Aug. 1994), pp. 190-198, vol. 253.

Booker, G. et al., "Efficient Availability Evaluation for Transport Backbone Networks" International Conference on Optical Network Design and Modeling (Mar. 12-14, 2008), pp. 1-6.

Lin, H. Y. et al., "Minimal Cutset Enumeration and Network Reliability Evaluation by Recursive Merge and BDD" IEEE Proceedings of the Eighth IEEE Symposium on Computers and Communications (Jun. 30-Jul. 3, 2003) pp. 1341-1346.

Vazirani, V. et al., "Suboptimal Cuts: Their Enumeration, Weight and Number" Automata, Languages and Programming (1992) pp. 366-377, vol. 623.

Newman, M.E.J., "Analysis of Weighted Networks" Phys. Rev. E (Jul. 20, 2004) pp. 1-9, vol. 70.

Martinez, S.A. et al., "A Weighted-Graph Approach for Dynamic Airspace Configuration" American Institute of Aeronautics and Astronautics, Guidance, Navigation, and Control Conference (Aug. 20-23, 2007) pp. 1-16.

Chinneck, J.W. Practical Optimization: A Gentle Introduction; Chapter 9: Maximum Flow and the Minimum Cut, http://www.sce.carleton.ca/faculty/chinneck/po.html (2000) pp. 1-8.

Baruah, N. et al. "On a Traffic Control Problem Using Cut-Set of Graph" Int. J. Advanced Networking and Applications (Jan.-Feb. 2012) pp. 1240-1244, vol. 3, No. 4.

Office Action dated Apr. 29, 2013, received in a related U.S. Patent Application, namely U.S. Appl. No. 13/544,369.

* cited by examiner

EFFICIENT EVALUATION OF NETWORK ROBUSTNESS WITH A GRAPH

BACKGROUND

The present disclosure relates to a methodology for evaluating a network for robustness employing a graph and a system for implementing the same.

The ability to monitor, model, and simulate flow parameters on a network is vital in planning, constructing, and maintaining the network in a condition that is robust enough to withstand disruptive events. The ability to monitor, model and simulate traffic conditions on roads of large cities and metropolitan areas has become increasingly essential for transportation agencies and other organizations involved in providing services to citizens (such as the police, fire departments or time-sensitive delivery companies) and planning more robust infrastructure in the path towards smarter cities. Due to the increasing frequency of adverse weather events, cities have to deal with emergency situations during which certain areas may experience difficult road conditions or be rendered completely inaccessible. Identifying the possible disconnections of the road network (meaning the unavailability of a given set of roads that results in a certain part of the city being isolated) and determining their impact on traffic conditions are important factors that city planners and infrastructure managers would like to consider when modeling and simulating traffic so that alternative mitigating measures can be planned in advance or investments be determined in order to avoid such situations.

Further, supply chain network of a distributor or an assembly line of a product that requires many components are vulnerable to disruptions. For example, throughput of a car assembly line or an airplane assembly line can be significantly decreased when certain components are not delivered in time for any reason, including geopolitical conflicts and natural disasters. In addition, electricity supply network can be disrupted by anticipated or unanticipated natural disasters.

Performing simulations on a large network, however, can be both time and resource consuming as the network often comprises a large mathematical graph ("graph" hereafter) with more than tens of thousands of nodes and edges. The currently known approaches for simulating disconnections in a network employ examination of combinations of edge disconnections. However, considering k-edge-disconnected cases for an n-edge graph, produces disconnection scenarios on an order of $n^k$, i.e., n to the k-th power. As the number of n increases, the number of disconnections can easily become an astronomical number that even modern computers cannot handle.

BRIEF SUMMARY

Likely disconnections or system-level-impact producing slowdown in a flow parameter in a network can be identified by annotating a graph representing the network with a weight to edges of a graph representing the network. The weight can be linearly or non-linearly proportional to the inverse of the severity of the impact and/or linearly or non-linearly proportional to the inverse of the likelihood of disconnection. Minimal cut sets needed to generate a disconnection in the network are identified from the annotated network based on the weights on the edges. The minimal cut sets can be enumerated in the order of a monotonically changing weight parameter, which is calculated from the individual weights of edges. Subsets of each minimal cut set are generated and evaluated during a simulation. The subsets can correspond to almost isolated scenarios for the network. The scope of the simulations can be reduced since partial simulations can be run for each isolating scenario and a smaller set of disconnections having the greatest impact on the flow parameter can be considered.

According to an aspect of the present disclosure, a method of simulating at least one flow parameter of a network is provided. The method includes: generating a graph representing a network to be simulated; generating an annotated graph from the graph by assigning a weight to edges of the graph based on available data, wherein the weight is selected from a likelihood weight representing a likelihood that a corresponding edge is connected during operation of the network, an impact weight measuring a degree of impact to at least one flow parameter of the network upon disconnection of the corresponding edge, and a combination of the likelihood weight and the impact weight; generating minimal cut sets from the annotated graph; selecting a collection of minimal cut sets that is less than an entirety of the generated minimal cut sets; generating almost isolating scenarios from the minimal cut sets in the collection by removing at least one cut from each of the minimal cut sets; and running a simulation on the at least one flow parameter for the almost isolating scenarios, wherein at least one step of the generating of the graph, the generating of the annotated graph, the generating of the minimal cut sets, the selecting of the collection, the generating of the almost isolating scenarios, and the running of the simulation is performed employing one or more processors configured to run an automated program.

According to another aspect of the present disclosure, a method of modifying a network through simulation is provided. The method includes: generating a graph representing a network to be simulated; generating an annotated graph from the graph by assigning a weight to edges of the graph based on available data, wherein the weight is selected from a likelihood weight representing a likelihood that a corresponding edge is connected during operation of the network, an impact weight measuring a degree of impact to at least one flow parameter of the network upon disconnection of the corresponding edge, and a combination of the likelihood weight and the impact weight; generating minimal cut sets from the annotated graph; selecting a collection of minimal cut sets that is less than an entirety of the generated minimal cut sets; generating almost isolating scenarios from the minimal cut sets in the collection by removing at least one cut from each of the minimal cut sets; running a simulation on the at least one flow parameter for the almost isolating scenarios; identifying at least one system-level-impact producing scenarios from the simulation; and modifying the network to alleviate the system level impact under the identified at least one system-level-impact producing scenarios, wherein at least one step of the generating of the graph, the generating of the annotated graph, the generating of the minimal cut sets, the selecting of the collection, the generating of the almost isolating scenarios, the running of the simulation, the identifying of the at least one system-level-impact producing scenario, and the modifying of the network is performed employing one or more processors configured to run an automated program.

According to yet another aspect of the present disclosure, a system for simulating at least one flow parameter of a network is provided. The system includes one or more processing units configured for performing steps of: generating a graph representing a network to be simulated; generating an annotated graph from the graph by assigning a weight to edges of the graph based on available data, wherein the weight is selected from a likelihood weight representing a likelihood that a corresponding edge is connected during operation of the network, an impact weight measuring a degree of impact to at least one flow parameter of the network upon disconnection of the corresponding edge, and a combination of the likelihood weight and the impact weight; generating minimal cut sets from the annotated graph; selecting a collection of minimal cut sets that is less than an entirety of the generated minimal cut sets; generating almost isolating scenarios from the minimal cut sets in the collection by removing at least one cut from each of the minimal cut sets; and running a simulation on the at least one flow parameter for the almost isolating scenarios.

According to still another aspect of the present disclosure, a system of modifying a network through simulation is provided. The system includes one or more processing units configured for performing steps of: generating an annotated graph from the graph by assigning a weight to edges of the graph based on available data, wherein the weight is selected from a likelihood weight representing a likelihood that a corresponding edge is connected during operation of the network, an impact weight measuring a degree of impact to at least one flow parameter of the network upon disconnection of the corresponding edge, and a combination of the likelihood weight and the impact weight; generating minimal cut sets from the annotated graph; selecting a collection of minimal cut sets that is less than an entirety of the generated minimal cut sets; generating almost isolating scenarios from the minimal cut sets in the collection by removing at least one cut from each of the minimal cut sets; running a simulation on the at least one flow parameter for the almost isolating scenarios; identifying at least one system-level-impact producing scenarios from the simulation; and modifying the network to alleviate the system level impact under the identified at least one system-level-impact producing scenarios.

DETAILED DESCRIPTION

As stated above, the present disclosure relates to a methodology for evaluating a network for robustness employing a graph and a system for implementing the same, which are now described in detail with accompanying figures. The drawings are not necessarily drawn to scale.

As used herein, a "flow parameter" refers to a parameter that measures the functionality of a network. For example, a traffic network can have a flow parameter representing the flow of the traffic. A supply network can have a flow parameter representing the flow (transportation) of goods. An electricity network can have a flow parameter representing the amount of power transmission. It is noted that a network can be characterized by more than one flow parameter. For example, a traffic network can be represented by the traffic flows of different types of vehicles, and the supply network can be represented by the flows of different types of goods (grains, minerals, etc.).

As used herein, a "graph" is a collection of nodes (vertices) and edges connecting the nodes as employed to model a network. Every edge has two endpoints in the set of nodes, and is said to connect or join the two endpoints. An edge can thus be defined as a set of two vertices. A node (vertex) can be simply drawn as a dot. The vertex set of a graph G is usually denoted by V(G). The order of a graph G is the number of its vertices, i.e. |V(G)|. The size of a graph is the number of its edges.

As used herein, two vertices are "adjacent" if an edge exists between them.

A "subgraph" of a graph is a graph whose vertex set is a subset of that of G, and whose adjacency relation is a subset of that of G restricted to this subset.

As used herein, a "cut" is a partition of the nodes (vertices) of a graph into two disjoint subsets.

As used herein, a "cut set" is a combination of edges of a graph, which causes a disruption in at least one flow parameter of a network represented by the graph when collectively removed. Each cut set corresponds to a combination of component failures that can cause a system failure in the network. A cut set is the set of edges whose end points are in different subsets of the partition caused by a corresponding cut.

As used herein, a cut set is a "minimal cut set" if, when any edge is removed from the cut set, the remainder of the cut set is no longer a cut set.

As used herein, a "sign" of a quantity refers to whether the quantity is positive or negative, i.e., whether the quantity is greater than zero or less than zero.

Figure 1:
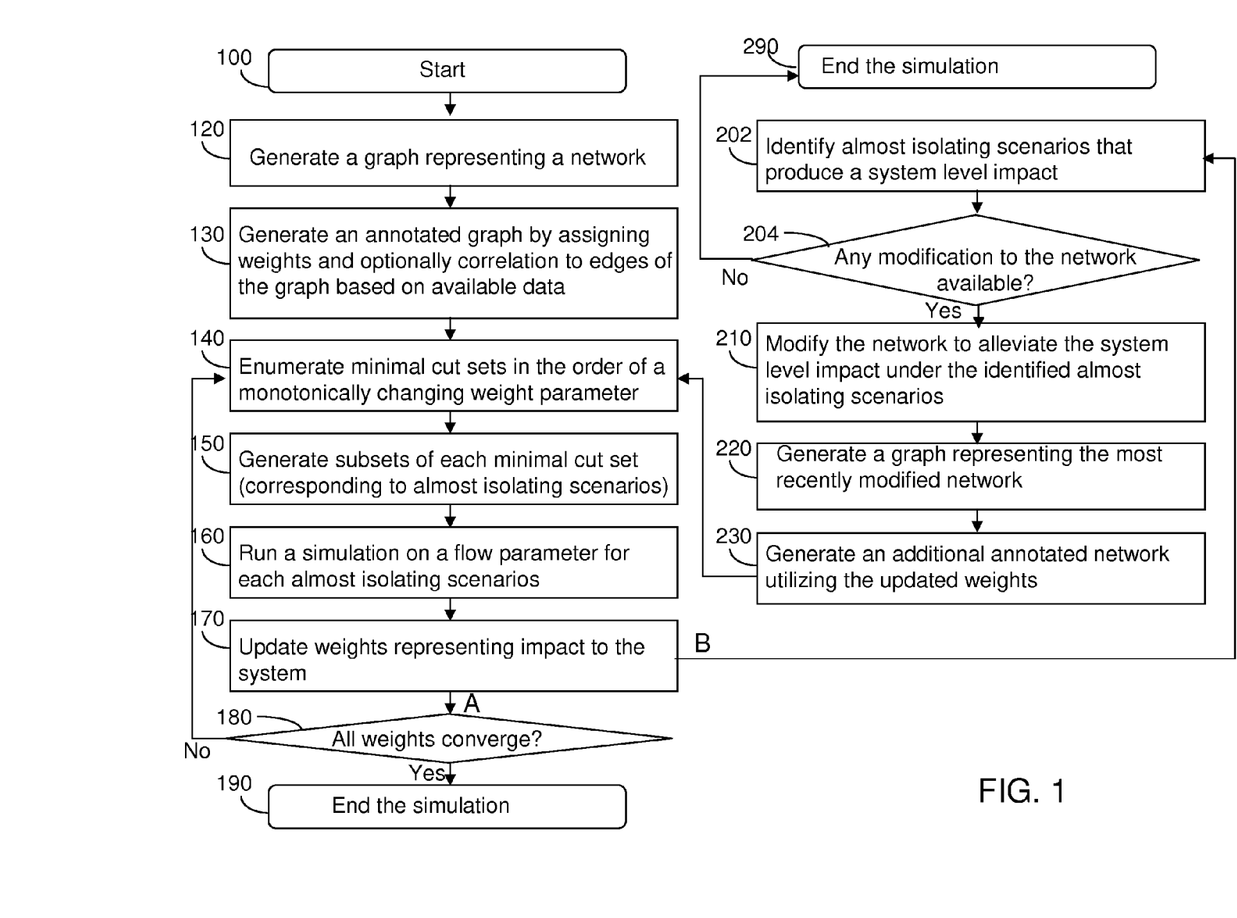
FIG. 1 is a flow chart illustrating a method of identifying, and selectively performing simulations on, almost isolating scenarios for a network represented by a graph according to an embodiment of the present disclosure.

Referring to FIG. 1, a flow chart according to an embodiment of the present disclosure illustrates a method of identifying, and selectively performing simulations on, almost isolating scenarios for a network represented by a graph. At least one flow parameter of a network can be simulated employing the steps of the flow chart. A computing means including one or more processing units can be configured for performing the various steps of the flow chart.

Referring to step 100, the process flow can commence by identifying a network to be simulated. The network to be simulated can be a traffic network, a supply chain network, an electrical power supply network, or any other network that can be characterized by at least one flow parameter representing a flow of a quantifiable variable as known in the art. In a non-limiting example, the network can be a road network of a large metropolitan area.

Figure 2:
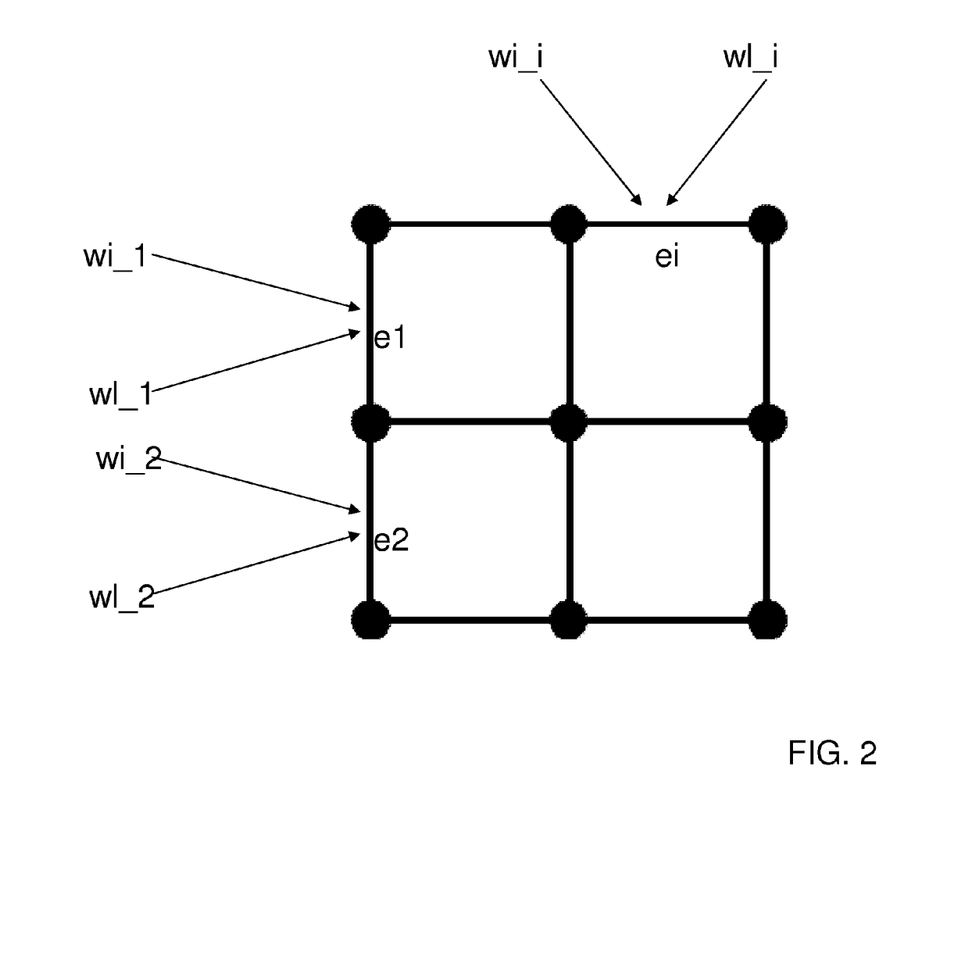
FIG. 2 is an exemplary graph according to an embodiment of the present disclosure.

Referring to step 120, a graph representing the network is generated employing methods known in the art. Referring to FIG. 2, an exemplary graph is illustrated, which includes nodes represented by dots and edges represented by solid lines. In a non-limiting example, a city planner can prepare a graph that represents the road network of the city to be evaluated for traffic flow.

Referring to step 130, an annotated graph is generated by assigning weights to edges of the graph based on available data. Optionally, correlation between edges of the graph can be assigned to each pair of edges.

Specifically, the annotated graph is generated from the graph by assigning a weight to edges of the graph based on available data. The weight includes at least one of a likelihood weight and an impact weight. The likelihood weight represents a likelihood that a corresponding edge is connected during operation of the network. The impact weight measures a degree of impact to at least one flow parameter of the network upon disconnection of the corresponding edge.

Referring to FIG. 2, the process of assigning a weight to edges of the graph is schematically illustrated. For the first edge e1, a first likelihood weight wl_1 and a first impact weight wi_1 are assigned. For the second edge e2, a second likelihood weight wl_2 and a second impact weight wi_2 are assigned. This process is continued for an i-th edge ei, for example, by assigning an i-th likelihood weight wl_i and an i-th impact weight wi_i are assigned for each i greater than 2 and up to an integer equal to the number of the total edges in the graph.

In one embodiment, the likelihood weight is a non-negative real number correlating with the probability that a particular edge is connected during operation of the network. The likelihood weight can positively or negatively correlate with the probability that a particular edge is connected during operation of the network. In one embodiment, the likelihood weight can be linearly, or non-linearly, proportional to the probability that a particular edge is connected during operation of the network. In one embodiment, the likelihood weight can be the probability that a particular edge is connected during operation of the network. In one embodiment, the likelihood weight can have a value from, and including, 0 to, and including, 1.

In one embodiment, the impact weight is a non-negative real number correlating with a quantifiable deleterious impact on the at least one flow parameter of the network. The impact weight can positively or negatively correlate with the quantifiable deleterious impact on the at least one flow parameter of the network. In one embodiment, the impact weight can be linearly, or non-linearly, proportional to the quantifiable deleterious impact on the at least one flow parameter of the network. In one embodiment, the impact weight can be the inverse of a normalized quantifiable deleterious impact on the at least one flow parameter of the network. In one embodiment, the impact weight can have a value inversely proportional to the normalized quantifiable deleterious impact.

In one embodiment, at least one likelihood weight and/or at least one impact weight can be directly input by an operator of a system running a program that displays, or otherwise represents, the graph. In another embodiment, at least one likelihood weight and/or at least one impact weight can be determined by data that is input to the system at the time of providing the network, at the time of generating the graph, or after generating the graph.

The at least one likelihood weight and/or the at least impact weight can be provided by a simulations that generate information about disconnected edges. In one embodiment, the at least one likelihood weight and/or the at least impact weight can be inferred, or estimated, from historical data on incidents and from previously performed simulations on a same or similar network. If the network from which the graph is generated is a traffic network, the at least one likelihood weight and/or the at least impact weight can be based on traffic simulation data and/or flood simulation data.

In an exemplary illustration, the graph can represent the entire city road network or a subset of the entire city road network. Each road can be represented by an edge, and each intersection can be represented by a node. The at least one flow parameter can be traffic flow, which can be measured, for example, by the number of vehicles that pass through a center portion of a road corresponding to an edge of the graph.

In one embodiment, each likelihood weight can be the probability that the road is functional during the operation of the network, i.e., the city road network. The time interval of interest can be any time period of interest that is selected for the purpose of simulation. The criterion for determining the functionality of the road can be provided by empirical factors. For example, the criterion for determining the functionality of the road can be a fixed multiple (e.g., 3, 4, or 5) of normal traffic level or can be a number generated by a projected traffic level necessary to maintain the city road network functional. In one embodiment, the probability that a road is functional can be determined by historical data. In this case, each likelihood weight can be a real number between, and including, 0 and 1. In one embodiment, one or more processing units in a system employed to generate the annotated graph can be configured to assign a value of said likelihood weight from, and including, 0 to a positive number less than 1.0 for each edge in the graph. A small value for the likelihood weight means that the corresponding road is likely to be disconnected, and a large value for the likelihood weight means that the corresponding road is unlikely to disconnect, i.e., likely to stay connected during the operation of the road network.

In one embodiment, the network is a traffic network, the at least one flow parameter includes traffic flow, and the likelihood weight can be determined by the total number of passing vehicles per unit time on the road corresponding to each edge. For example, the likelihood weight can be given by Z/Nv, wherein Z is a normalization constant, and Nv is the total number of passing vehicles per unit time on a road corresponding to an edge of the graph. If Nv is zero, we assign a large number to the likelihood weight. Alternately, the likelihood weight can be given by Y/Nw, wherein Y is a normalization constant, and Nw is the total number of vehicles per unit length on a road corresponding to an edge of the graph. If Nw is zero, we assign a large number to the likelihood weight. Yet alternately, the likelihood weight can be given by a weighted linear combination or a product of $(Z/Nv)^\alpha$ and $(Y/Nw)^\beta$, i.e., $A \times (Z/Nv)^\alpha + B \times (Y/Nw)^\beta$ or $C \times (Z/Nv)^\alpha \times (Y/Nw)^\beta$, or a combination thereof, i.e., $D \times (Z/Nv)^\alpha + E \times (Y/Nw)^\beta + F \times (Z/Nv)^\alpha \times (Y/Nw)^\beta$, wherein $\alpha$ and $\beta$ are positive real numbers, and A, B, C, D, E, and F are non-zero real numbers.

In one embodiment, the network is a traffic network, the at least one flow parameter includes traffic flow, and the likelihood weight can be determined by a parameter characterizing a magnitude of a natural or manmade disaster. For example, the likelihood weight can be given by Z'/WL, wherein Z' is a normalization constant, and WL is a water level during a simulated flood on a road corresponding to an edge of the graph. If WL is zero, we assign a large number to the likelihood weight.

The impact weight can be linearly or non-linearly proportional to an inverse of a quantified deleterious effect on the at least one flow parameter. The impact weight for an edge can be estimated based on historical data, or any other simulations that identify the importance of keeping particular edges connected to maintain the at least one flow parameter of the network within a normal range.

If estimation of the impact weight based on historical data or other simulations is not available for any edge, the impact weight for the corresponding edge can be set at a default value, which can be, for example, an estimated average value for impact weight for the network. The impact weight is a non-negative real number, and the predetermined range is from, and including, 0 to a predefined number. If the impact weight is normalized, the impact weight can have a value from, and including, 0 to, and including, 1.

In one embodiment, data on correlation of disconnection of sets of edges can be optionally added to the annotated graph. The data on correlation of disconnection of sets of edges can be based on historical data, map data, or terrain data. In this case, the generation of the annotated graph can include the steps of assigning disconnection correlation data to edges of the graph, and contracting adjoining edges of the graph (to convert the adjoining edges into a single edge and eliminate intermediate nodes) based on the disconnection correlation data.

Referring to step 140 of FIG. 1, minimal cut sets are generated from the annotated graph.

In one embodiment, the generation of the minimal cut sets can be effected by (1) the maximum number J of the minimal cut sets, (2) generating subsets of each of the cut sets by iteratively removing edges from each of the cut sets, and (3) determining whether each of the subsets is a cut set.

The maximum number J of the minimal cut sets to be generated can be selected to depending on the level of simulation for the at least one flow parameter and the amount of computation time available for the simulation. In a "peacetime" simulation in which the computational resources are not limited in a significant manner, the maximum number J can be set at a relatively large value. In an "emergency" simulation in which the computational resources may be limited, the maximum number J can be set at relatively low value.

Methods of generating cut sets having cardinality K for a given network having N edges are known, for example, in Vazirani, V., Yannakakis, M., Suboptimal cuts: their enumeration, weight, and number. Lecture Notes in Computer Science, Vol. 623/1992, 1992, and Li-Pu Yeh •Biing-Feng Wang •Hsin-Hao Su, Efficient Algorithms for the Problems of Enumerating Cuts by Non-decreasing Weights. The enumeration method of the present disclosure can be applied to both an undirected graph and a directed graph. In one embodiment, users can specify two nodes to be separated. In another embodiment, users need not specify such nodes.

For each cut set having the cardinality K, i.e., the total number of edges to be disconnected, subsets of the cut set that are minimal cut sets are identified. The identification of the minimal cut sets can be performed by generating subsets of each of the cut sets having the cardinality K by iteratively removing edges from each of the cut sets, and determining whether each of the subsets is a cut set.

The process of iteratively removing edges from a cut set having the cardinality K can be performed by generating $_KC_1$ (which is equal to K) first subsets having the cardinality of (K−1) from the cut set. The first subsets are examined to determine if any of the $_KC_1$ first subsets is a cut set. If none of the $_KC_1$ first subsets is a cut set, the cut set having the cardinality K is a minimal cut set. If any of the $_KC_1$ first subsets is a cut set, the cut set having the cardinality K is not a minimal cut set, second subsets having the cardinality of (K−2) is generated from the $_KC_1$ (which is equal to K) first subsets by removing one more edge. The total number of second cut sets is $_KC_2$ (which is equal to K(K−1)/2). For each selected $_KC_1$ first subsets, if none of the second subsets having one less edge than the selected first subset is a cut set, the selected first cut set having the cardinality (K−1) is a minimal cut set. If any of the second subsets having one less edge than the selected first subset is a cut set, the selected first cut set is not a minimal cut set, i.e., is a non-minimal cut set. For each integer p greater than 1, each non-minimal cut set having the cardinality of (K−p) is selected for generation of (p+1)-th subsets having the cardinality (K−p−1). The (p+1)-th subsets generated from the selected p-th subset are examined to determine if any of the (p+1)-th subsets having one less edge than the selected p-th subset is a cut set. If none of the (p+1)-th subsets having one less edge than the selected p-th subset is a cut set, the selected p-th cut set having the cardinality (K−p) is a minimal cut set. This process continues with an increasing value of p until all minimal cut sets that are subsets of a cut set having the cardinality K is identified. Further, this process continues for each cut set having the cardinality K.

Once the minimal cut sets are generated, a collection of minimal cut sets that is less than the entirety of the generated minimal cut sets is selected. The selection of the collection of minimal cut sets corresponds to the minimal cut sets for which simulation is to be subsequently performed. The minimal cut sets that are not included in the collection are considered to be not important enough to warrant a simulation. Thus, the selection of the collection of minimal cut sets determines which minimal cut sets are to be subsequently examined in simulations and which minimal cut sets are not to be examined through simulations. As such, the selection of the collection of minimal cut sets is performed in a manner that includes minimal cut sets that are either more likely to fail than unselected minimal cut sets, in a manner that includes more detrimental cut sets, upon failure, to the system performance of the network than unselected minimal cut sets, or a combination of considerations for likelihood of failure and level of detriment to the system upon failure for each of the minimal cut sets.

In one embodiment, the selection of the collection of the minimal cut sets can be performed by: (1) selecting each minimal cut set among the generated minimal cut sets one at a time; (2) for each selected minimal cut set, assigning a weight parameter that depends on each value of the weight assigned to edges within the selected minimal cut set; and (3) employing a value of the weight parameter to determine whether each minimal cut set is included within the collection.

For each minimal cut set among the collection of all minimal cut sets thus identified, a weight parameter is assigned. The weight parameter is a function of all weights of edges within a given minimal cut set. The weight parameter can be a scalar function, i.e., a function that has a value of a scalar. The scalar can be a real number. In one embodiment, a change in the weight parameter has the same sign for any increment in a value of the weight of any edge within the selected minimal cut set.

In one embodiment, the weight parameter is a number that changes with any change in a value of the likelihood weight of any edge within the corresponding minimal cut set. The change in the weight parameter has a same sign (which is either positive or negative) for any increment in a value of the likelihood weight of any edge within the corresponding minimal cut set. In one embodiment, the weight parameter can decrease with any change in a value of the likelihood weight of any edge within the corresponding minimal cut that adversely impacts the at least one flow parameter of the network. For example, if the value of the likelihood weight for an edge represents the probability that the path (e.g., road) represented by the edge is functional during the operation of the network, a decrease in the value of the likelihood weight represents a change that adversely impact the at least one flow parameter of the network, and therefore, the weight parameter decreases.

In one embodiment, the likelihood weight is defined such that the value of the likelihood weight decreases for a change adversely impacting the at least one flow parameter of the network (e.g., as the probability that the edge is functional) for all edges in the graph, and the weight parameter can be defined as a number that linearly or non-linearly decreases with a decrease in any of the values for the likelihood weight in the corresponding minimal cut set. For example, if the minimal cut set consists of em1, em2, . . . , emT, each having the value of wl_m1, wl_m2, . . . , or wl_mT, respectively, for the likelihood weight, the weight parameter WP for the minimal cut set can be defined as:

$$WP = U \sum_{r=1}^{T} (\text{wl\_mr})^{\eta},$$

in which U is a normalization constant and η is a positive real number, or $$WP = V \prod_{r=1}^{T} (\text{wl\_mr})^{\kappa},$$

in which V is a normalization constant and κ is a positive real number, or a combination thereof.

In one embodiment, the weight parameter is a number that changes with any change in a value of the impact weight of any edge within the corresponding minimal cut set. The change in the weight parameter has a same sign (which is either positive or negative) for any increment in a value of the impact weight of any edge within the corresponding minimal cut set. In one embodiment, the weight parameter can decrease with any change in a value of the impact weight of any edge within the corresponding minimal cut that adversely impacts the at least one flow parameter of the network. For example, if the value of the impact weight for an edge represents the probability that the path (e.g., road) represented by the edge is functional during the operation of the network, a decrease in the value of the impact weight represents an adverse change in the at least one flow parameter of the network, and therefore, the weight parameter decreases.

In one embodiment, the impact weight can be defined such that the value of the impact weight decreases for an adverse change in the at least one flow parameter of the network for all edges in the graph, and the weight parameter can be defined as a number that linearly or non-linearly decreases with a decrease in any of the values for the impact weight in the corresponding minimal cut set. For example, if the minimal cut set consists of em1, em2, . . . , emT, each having the value of wi_m1, wi_m2, . . . , or wi_mT, respectively, for the impact weight, the weight parameter WP for the minimal cut set can be defined as:

$$WP = U' \sum_{r=1}^{T} (\text{wi\_mr})^{\eta'},$$

in which U' is a normalization constant and η' is a positive real number, or $$WP = V' \prod_{r=1}^{T} (\text{wi\_mr})^{\kappa'},$$

in which V' is a normalization constant and κ' is a positive real number, or a combination thereof.

In yet another embodiment, the weight parameter is a number that changes with any change in a value of the likelihood weight of any edge within the corresponding minimal cut set with any change in a value of the impact weight of any edge within the corresponding minimal cut set. The change in the weight parameter has a same sign (which is either positive or negative) for any increment in a value of the likelihood weight of any edge within the corresponding minimal cut set and for any increment in the value of the impact weight of any edge within the corresponding minimal cut set. In one embodiment, the weight parameter can decrease with any change in a value of the likelihood weight of any edge within the corresponding minimal cut that adversely impacts the at least one flow parameter of the network, and decrease with any change in a value of the impact weight of any edge within the corresponding minimal cut that adversely impacts the at least one flow parameter of the network. For example, if the value of the likelihood weight for an edge represents the probability that the path (e.g., road) represented by the edge is functional during the operation of the network, a decrease in the value of the likelihood weight represents a change that adversely impacts the at least one flow parameter of the network, and therefore, the weight parameter decreases. Further, if the value of the impact weight for an edge represents the probability that the path (e.g., road) represented by the edge is functional during the operation of the network, a decrease in the value of the impact weight represents an adverse change in the at least one flow parameter of the network, and therefore, the weight parameter decreases.

In one embodiment, the likelihood weight is defined such that the value of the likelihood weight decreases for a change adversely impacting the at least one flow parameter of the network (e.g., as the probability that the edge is functional) for all edges in the graph and the value of the impact weight decreases for an adverse change in the at least one flow parameter of the network for all edges in the graph, and the weight parameter can be defined as a number that linearly or non-linearly decreases with a decrease in any of the values for the likelihood weight in the corresponding minimal cut set and linearly or non-linearly decreases with a decrease in any of the values for the impact weight in the corresponding minimal cut set. For example, if the minimal cut set consist of em1, em2, . . . , emT, each having the value of wl_m1, wl_m2, . . . , or wl_mT, respectively, for the likelihood weight and having the value of wi_m1, wi_m2, . . . , or wi_mT, respectively, for the impact weight, the weight parameter WP for the minimal cut set can be defined as:

$$LW = U \sum_{r=1}^{T} (\text{wl\_mr})^{\eta} + U' \sum_{r'=1}^{T} (\text{wi\_mr'})^{\eta'},$$

in which U and U' are normalization constants, and η η' are a positive real numbers, or $$LW = V \prod_{r=1}^{T} (\text{wl\_mr})^{\kappa} \times \prod_{r'=1}^{T} (\text{wi\_mr'})^{\kappa'},$$

in which V is a normalization constant and κ and κ' are positive real numbers, or a combination thereof.

The minimal cut sets identified from the annotated graph can be subsequently ordered in the order of a monotonically changing weight parameter. Some of the minimal cut sets that are less in number than the total number of the minimal cut sets are selected such that the selected minimal cut sets represent a more adverse condition to the network represented by the annotated graph than the minimal cut sets that are not selected. The selected minimal cut sets constitute the collection of the minimal cut sets.

In one embodiment, the selection of the minimal cut sets to define the collection of minimal cut sets can be performed by:

(1) ordering all of the generated minimal cut sets in an order of a monotonically changing order of the weight parameter; and (2) selecting a predetermined number N_mcs of the generated minimal cut sets either from the first N_mcs number of the ordered generated minimal cut sets or from the last N_mcs number of the ordered generated minimal cut sets.

For example, if the weight parameter WP is defined such that the value of the likelihood weight decreases for a change adversely impacting the at least one flow parameter of the network for all edges in the graph and the value of the impact weight decreases for an adverse change in the at least one flow parameter of the network for all edges in the graph, a small value for the weight parameter WP represents a more adverse condition to the network than a large value for the weight parameter WP. In one embodiment, the selected collection of the minimal cut sets can be generated from the entire collection of all minimal cut sets by selecting the minimal cut sets having a value for the weight parameter WP that is less than a predefined threshold value. In another embodiment, the selected collection of the minimal cut sets can be generated from the entire collection of all minimal cut sets by selecting a predetermined number N_mcs of minimal cut sets starting from the first minimal cut set and ending with the N_mcs-th minimal cut set after ordering the entire collection of all minimal cut sets in the order of a monotonically increasing weight parameter WP.

In another embodiment, the selection of the minimal cut sets to define the collection of minimal cut sets can be performed by selecting, for the collection, each of the generated minimal cut sets having the value of the weight parameter that is greater than or lesser than a predefined threshold value. For example, if the weight parameter WP is defined such that the value of the likelihood weight decreases for a change adversely impacting the at least one flow parameter of the network for all edges in the graph and the value of the impact weight decreases for an adverse change in the at least one flow parameter of the network for all edges in the graph, the selection of the minimal cut sets to define the collection of minimal cut sets can be performed by selecting, for the collection, each of the generated minimal cut sets having the value of the weight parameter that is lesser than the predefined threshold value, which can be selected to keep the total number of minimal cut sets within the selection within a limit that a system including one or more processing units can process within available calculation time.

Referring to step 150 of FIG. 1, subsets are generated for each of the minimal cut sets within the collection. Each subset of the minimal cut sets within the collection corresponds to a subgraph of the graph generated at step 120 of FIG. 1.

Figure 3:
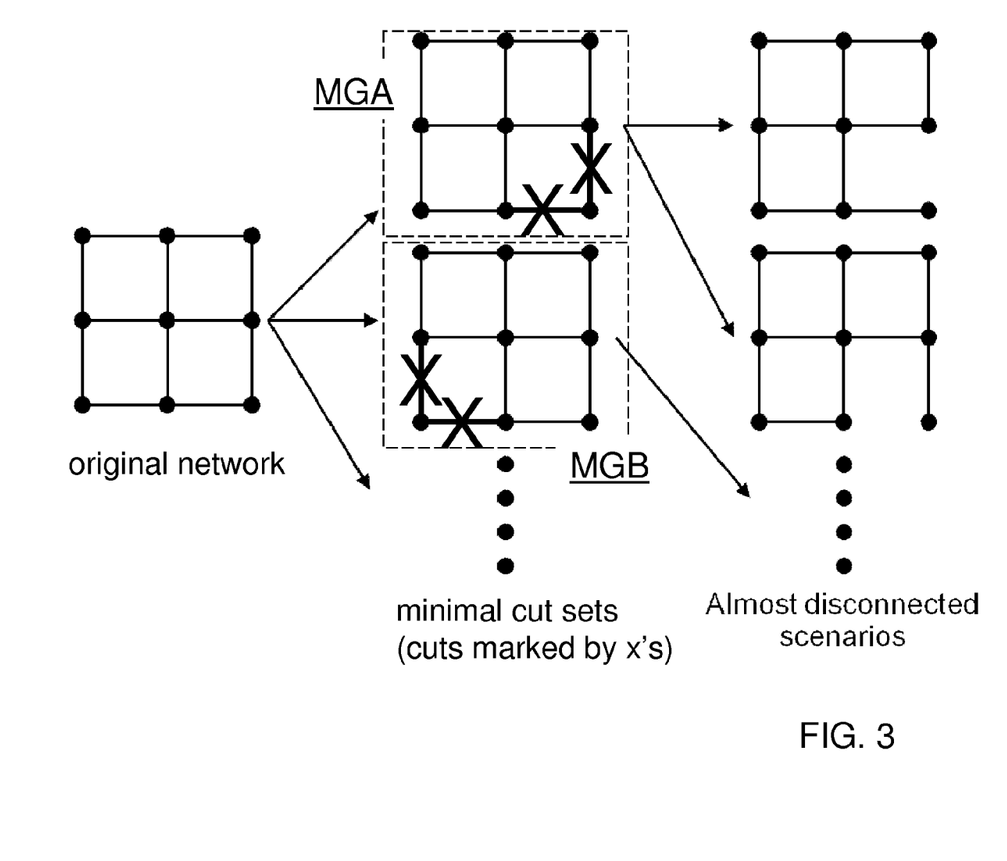
FIG. 3 is a schematic diagram illustrating a method of generating subgraphs representing almost isolating scenarios from graphs including a minimal cut set according to an embodiment of the present disclosure.

Referring to FIG. 3, a schematic diagram illustrates a method of generating subgraphs from minimal cut sets. Each minimal cut set is represented by a group of edges marked by X's. In FIG. 3, a first minimal cut set consists of two edges in a marked graph MGA, and a second minimal cut set consists of two edges in a marked graph MGB. For each minimal cut set having Q edges (and corresponding to a subgraph (of the annotated graph) that is missing the same Q edges), Q subgraphs having (Q-1) cuts are generated from the annotated graph, each corresponding to the presence of an extra edge relative to the graph in which the Q edges are missing. For example, for the first minimal cut set having two edges and the corresponding subgraph missing the same two edges, subgraphs missing only one of the two edges are generated.

Because the subgraphs missing a set of edges that includes one less edge than the minimal cut sets does not include a cut, these subgraphs do not represent an isolating scenario in which the network becomes dysfunctional. However, each of these subgraphs represents almost isolating scenarios in which the functionality of the network is potentially significantly impaired. In other words, the set of subsets generated from the collection of minimal cut sets by adding one edge among a minimal cut set to the subgraph representing the corresponding minimal cut set represent a set of almost isolating scenarios for the network.

In general, subgraphs missing less edges than a full set of edges of a minimal cut set can be employed. The difference between the number of missing edges in any subgraph and the corresponding minimal cut set can be 1, or can be a small number that does not increase the number of subgraphs beyond the computing capability of a system employed to run the simulations. It is noted that for any minimal cut set having mc cuts, the number of associated subgraphs generated from the annotated graph and missing (mc−j) edges (i.e., j less edges than the full set of mc edges of the minimal cut set) is given by $_{mc}C_j$, i.e, $$\frac{mc!}{(mc-j)! \times j!},$$

in which j is a positive integer. Thus, the number of subgraphs to be generated for the purpose of representing almost isolating scenarios can be limited by practical considerations on the computing time. However, because the network becomes more connected with an increasing number of j, selecting a small number or even 1 for the maximum value of j can provide effective coverage of the almost isolating situations.

Referring to step 160 of FIG. 1 simulations are run on at least one flow parameter for each of the almost isolating scenarios.

In one embodiment, in case the computing time is limited, the almost isolating scenarios can be simulated in the order of the extreme value for the weight parameter WP. For example, if the weight parameter WP is defined such that the value of the likelihood weight decreases for a change adversely impacting the at least one flow parameter of the network for all edges in the graph and the value of the impact weight decreases for an adverse change in the at least one flow parameter of the network for all edges in the graph, the simulation of the almost isolating scenarios can start for the almost isolating scenarios corresponding to the least value of the weight parameter, and subsequently performed for the almost isolating scenarios corresponding to the least value among the values of the weight parameter WP for the remaining almost isolating scenarios.

The selection of the collection of the minimal cut sets that is less than the full set of the generated minimal cut sets enables selection of the almost isolating scenarios such that almost isolating scenarios that are not likely to occur or that invoke small impact. Further, the number of scenarios to be simulated is significantly reduced because only closely associated with minimal cut sets are simulated. Further, by incorporating historical data and other simulation data, the simulated scenarios can generate relevant scenarios.

Referring to step 170 of FIG. 1, impact weights can be updated to more closely represent the impact to at least one flow parameter or the overall impact to the system. If a value for the impact weight was a default value for some of the edges in the graph as assigned at step 130 of FIG. 1, a new impact weight reflecting the impact to at least one flow parameter under the almost isolating scenarios can be assigned to such edges in the graph. If a value for the impact weight was a value based on prior data for some other edges in the graph as assigned at step 130 of FIG. 1, an updated impact weight reflecting the impact to at least one flow parameter under the almost isolating scenarios can be assigned to these edges in the graph. Thus, a feedback is provided to the impact weight for further simulation.

Upon completion of step 170 of FIG. 1, the process flow can proceed to step 180 under scheme A, or can proceed to step 202 under scheme B. Under scheme A, the simulation to the system does not directly trigger another simulation on modification to the system.

At step 180, the convergence of the impact weight is determined by comparing the previous values for the impact weight (e.g., as assigned at step 130) and the updated values for the impact weight. Any statistical method for determining convergence in a simulation can be employed.

If convergence is determined, the process flow proceeds to step 190, and the simulation is terminated. The output data of the simulation includes updated sets of values for the impact weight of the edges in the graph. If convergence is not determined, i.e., if it is determined that the values for the impact weight is likely to change in any significant manner in subsequent iterative simulations, then the process flow can proceed to step 140.

Referring back to step 170 of FIG. 1, under scheme B, modification to the network can be further simulated. At step 202, at least one system-level-impact producing scenarios are identified from the simulation by analyzing the impact weight, the likelihood weight, or a combination thereof. For example, the impact weight, the likelihood weight, or the combination thereof can be analyzed for the almost isolating scenarios in the order of the extreme value for the weight parameter WP.

In one illustrative example, if the network is a traffic network, the planner can check the results of the traffic scenarios, by examining, for example, the roads where number of passing vehicles per unit time increase drastically.

Referring to step 204, the system employed to run an automated program for the simulation or an operator providing an input to the system determines if any modification to the network is available. This determination can be made by the automated program, if programmed to modify the network, or can be manually made by the operator.

If no modification is available, the process flow proceeds to step 290, and the simulation can be terminated with the most recently revised network.

If at least one modification to the network is available, the process flow proceeds to step 210. The network is modified to alleviate the system level impact under the identified at least one system-level-impact producing scenario.

Referring to step 220, a graph representing the most recently modified network is generated. Optionally, the new graph of the network can be generated disregarding the connections that may be disconnected (corresponding to edges that can be removed in the graph).

Referring to step 230, an additional annotated network utilizing the most recently undated weights is generated.

The process flow proceeds to step 140. Steps 140, 150, 160, and 170 are subsequently performed for: (1) generating additional minimal cut sets from the another annotated graph; (2) generating updated almost isolating scenarios from each of the additional minimal cut sets by removing at least one cut from each of the minimal cut sets; (3) running another simulation on the at least one flow parameter for the updated almost isolating scenarios; and (4) updating the impact weight for edges. Further, if scheme B is selected again, the processes of identifying at least one updated system-level-impact producing scenario from the another simulation and updating the most recently modified network to alleviate effects of the at least one updated system-level-impact producing scenario can be repeated at steps 202, 204, and 210.

Figure 4:
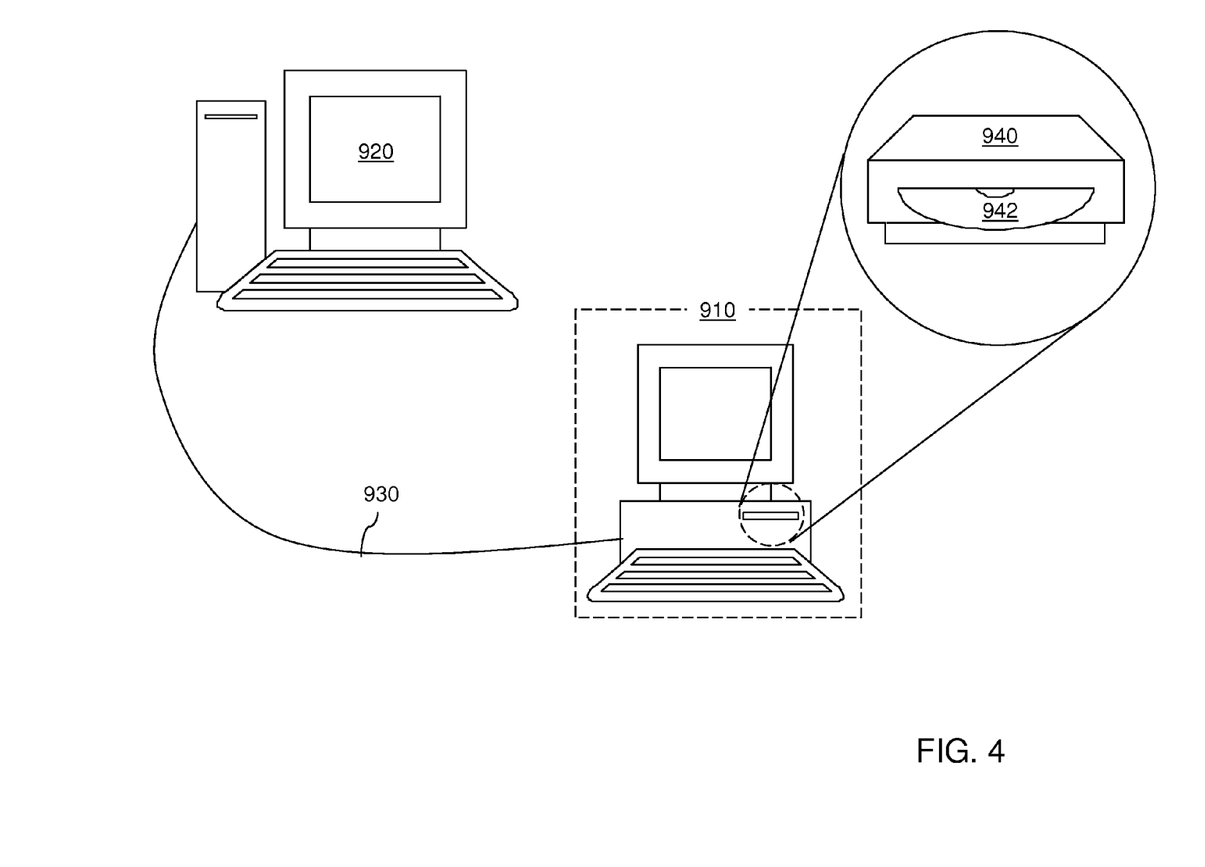
FIG. 4 illustrates an exemplary system for implementing the methods of the present disclosure.

At least one, or all of the processing steps described above can be performed employing a computing means including one or more processing units. Referring to FIG. 4, an exemplary system for implementing the methods of the present disclosure is illustrated. The system can include at least one computing means 910, which can be a computer or any computing device known in the art. The at least one computing means 910 includes one or more processing units and a memory that are configured to run an automated program. The at least one computing means 910 can be in communication with a database 920, which can be a standalone computing means or can be incorporated into the at least one computing means 910. If the database 920 is a standalone computing means, a data cable 930 or wireless communication can be employed to transfer data between the database 920 and the at least one computing means 910. The system further includes a non-transitory machine-readable data storage medium, which can be embedded within the at least one computing means 910, can be present within the database 920, or can be provided as a portable non-transitory machine-readable data storage medium 942 that can be accessed employing a data-writing device 940, which can optionally perform the task of reading data from the portable non-transitory machine-readable data storage medium 942. The database 920 can store design layouts, optical models, resist models, and/or OPC models. If the database 920 is not provided, design layouts, optical models, resist models, and/or OPC models can be stored in the at least one computing means 910.

The at least one computing means 910 can be employed to perform at least one or all steps of FIG. 1. In one embodiment, the at least one computing means 910 can be configured to perform the various steps of FIG. 1 automatically without human intervention once a network or a graph and corresponding input data for assigning the weight to the edges of the graph are provided. The result derived from any of the steps of FIG. 1 can be stored in at least one non-transitory machine-readable data storage medium that can be provided within the at least one computing means 910 and/or within at least one non-transitory machine-readable data storage medium provided within the database 920. The non-transitory machine-readable data storage medium may be of any type known in the art.

One or more non-transitory machine readable medium within the at least one computing means 910 and/or the database 920 can be a portable non-transitory machine-readable data storage medium 942 such as a CD ROM or a DVD ROM. A data-writing device 940 may be provided in the at least one computing means 910 or within the database 920 to enable storage of any data derived from the steps of FIG. 1.

In one embodiment, the automated program can include the steps of: generating a graph representing a network to be simulated; generating an annotated graph from the graph by assigning a weight to edges of the graph based on available data, wherein the weight is selected from a likelihood weight representing a likelihood that a corresponding edge is connected during operation of the network, an impact weight measuring a degree of impact to at least one flow parameter of the network upon disconnection of the corresponding edge, and a combination of the likelihood weight and the impact weight; generating minimal cut sets from the annotated graph; selecting a collection of minimal cut sets that is less than an entirety of the generated minimal cut sets; generating almost isolating scenarios from the minimal cut sets in the collection by removing at least one cut from each of the minimal cut sets; and running a simulation on the at least one flow parameter for the almost isolating scenarios.

In another embodiment, the automated program can include the steps of: generating a graph representing a network to be simulated; generating an annotated graph from the graph by assigning a weight to edges of the graph based on available data, wherein the weight is selected from a likelihood weight representing a likelihood that a corresponding edge is connected during operation of the network, an impact weight measuring a degree of impact to at least one flow parameter of the network upon disconnection of the corresponding edge, and a combination of the likelihood weight and the impact weight; generating minimal cut sets from the annotated graph; selecting a collection of minimal cut sets that is less than an entirety of the generated minimal cut sets; generating almost isolating scenarios from the minimal cut sets in the collection by removing at least one cut from each of the minimal cut sets; running a simulation on the at least one flow parameter for the almost isolating scenarios; identifying at least one system-level-impact producing scenarios from the simulation; and modifying the network to alleviate the system level impact under the identified at least one system-level-impact producing scenarios, wherein at least one step of the generating of the graph, generating of the annotated graph, generating of the minimal cut sets, generating of the almost isolating scenarios, the running of the simulation, the identifying of the at least one system-level-impact producing scenario, and the modifying of the network is performed employing one or more processors configured to run an automated program.

While the disclosure has been described in terms of specific embodiments, it is evident in view of the foregoing description that numerous alternatives, modifications and variations will be apparent to those skilled in the art. Various embodiments of the present disclosure can be employed either alone or in combination with any other embodiment, unless expressly stated otherwise or otherwise clearly incompatible among one another. Accordingly, the disclosure is intended to encompass all such alternatives, modifications and variations which fall within the scope and spirit of the disclosure and the following claims.

What is claimed is:

1. A method of simulating at least one flow parameter of a network, said method comprising:
generating a graph representing a network to be simulated;
generating an annotated graph from said graph by assigning a weight to edges of said graph based on available data, wherein said weight is selected from a likelihood weight representing a likelihood that a corresponding edge is connected during operation of said network, an impact weight measuring a degree of impact to at least one flow parameter of said network upon disconnection of said corresponding edge, and a combination of said likelihood weight and said impact weight;
generating minimal cut sets from said annotated graph;
selecting a collection of minimal cut sets that is less than an entirety of said generated minimal cut sets;
generating almost isolating scenarios from said minimal cut sets in said collection by removing at least one cut from each of said minimal cut sets; and
running a simulation on said at least one flow parameter for said almost isolating scenarios,
wherein at least one step of said generating of said graph, said generating of said annotated graph, said generating of said minimal cut sets, said selecting of said collection, said generating of said almost isolating scenarios, and said running of said simulation is performed employing one or more processors configured to run an automated program.

2. The method of claim 1, wherein said generating of said minimal cut sets comprises:
generating cut sets having a cardinality K from said annotated graph, said cardinality K being less than a total number of edges of said graph;
generating subsets of each of said cut sets by iteratively removing edges from each of said cut sets; and
determining whether each of said subsets is a cut set.

3. The method of claim 1, wherein said selecting of said collection of minimal cut sets comprises:
selecting each minimal cut set among said generated minimal cut sets one at a time;
for each selected minimal cut set, assigning a weight parameter that depends on each value of said weight assigned to edges within said selected minimal cut set; and
employing a value of said weight parameter to determine whether each minimal cut set is included within said collection.

4. The method of claim 3, wherein said employing of said value of said weight parameter comprises:
ordering all of said generated minimal cut sets in an order of a monotonically changing order of said weight parameter; and
selecting a predetermined number N_mcs of said generated minimal cut sets either from the first N_mcs number of said ordered generated minimal cut sets or from the last N_mcs number of said ordered generated minimal cut sets.

5. The method of claim 3, wherein said employing of said value of said weight parameter comprises selecting, for said collection, each of said generated minimal cut sets having said value of said weight parameter that is greater than or lesser than a predefined threshold value.

6. The method of claim 3, wherein a change in said weight parameter has a same sign for any increment in a value of said weight of any edge within said selected minimal cut set.

7. The method of claim 3, said weight comprises at least said likelihood weight.

8. The method of claim 7, wherein a change in said weight parameter has a same sign for any increment in a value of said likelihood weight of any edge within said selected minimal cut set.

9. The method of claim 7, wherein said network is a traffic network, and said at least one flow parameter comprises traffic flow.

10. The method of claim 9, wherein said likelihood weight is given by Z/Nv, wherein Z is a normalization constant, and Nv is a total number of passing vehicles per unit time on a road corresponding to an edge of said graph.

11. The method of claim 9, wherein said likelihood weight is given by Y/Nw, wherein Y is a normalization constant, and Nw is a total number of vehicles per unit length on a road corresponding to an edge of said graph.

12. The method of claim 11, wherein said likelihood weight is given by Z'/WL, wherein Z' is a normalization constant, and WL is a water level during a simulated flood on a road corresponding to an edge of said graph.

13. The method of claim 3, wherein said weight comprises said impact weight.

14. The method of claim 13, wherein a change in said weight parameter has a same sign for any increment in a value of said impact weight of any edge within said selected minimal cut set.

15. The method of claim 3, wherein said weight comprises said combination of said likelihood weight and said impact weight.

16. The method of claim 15, wherein a change in said weight parameter has a same sign for any increment in a value of said likelihood weight of any edge within said selected minimal cut set and for any increment in a value of said impact weight of any edge within said selected minimal cut set.

17. The method of claim 1, further comprising assigning an updated impact weight or a new impact weight reflecting an impact to at least one flow parameter under said almost isolating scenarios to at least some of edges in said graph.

18. A method of modifying a network through simulation, said method comprising:
generating a graph representing a network to be simulated;
generating an annotated graph from said graph by assigning a weight to edges of said graph based on available data, wherein said weight is selected from a likelihood weight representing a likelihood that a corresponding edge is connected during operation of said network, an impact weight measuring a degree of impact to at least one flow parameter of said network upon disconnection of said corresponding edge, and a combination of said likelihood weight and said impact weight;
generating minimal cut sets from said annotated graph;
selecting a collection of minimal cut sets that is less than an entirety of said generated minimal cut sets;
generating almost isolating scenarios from said minimal cut sets in said collection by removing at least one cut from each of said minimal cut sets;
running a simulation on said at least one flow parameter for said almost isolating scenarios;
identifying at least one system-level-impact producing scenarios from said simulation; and
modifying said network to alleviate said system level impact under said identified at least one system-level-impact producing scenarios,
wherein at least one step of said generating of said graph, said generating of said annotated graph, said generating of said minimal cut sets, said selecting of said collection, said generating of said almost isolating scenarios, said running of said simulation, said identifying of said at least one system-level-impact producing scenario, and said modifying of said network is performed employing one or more processors configured to run an automated program.

19. The method of claim 18, further comprising assigning an updated impact weight or a new impact weight reflecting an impact to at least one flow parameter under said almost isolating scenarios to at least some of edges in said another graph prior to said modifying of said network.

20. The method of claim 19, further comprising performing steps of:
generating another graph representing said a most recently modified network;
generating another annotated network from said another graph;
generating additional minimal cut sets from said another annotated graph;
generating updated almost isolating scenarios from each of said additional minimal cut sets by removing at least one cut from each of said minimal cut sets;
running another simulation on said at least one flow parameter for said updated almost isolating scenarios;
identifying at least one updated system-level-impact producing scenario from said another simulation.

21. The method of claim 19, further comprising performing, at least once, steps of:
updating said most recently modified network of claim 19 to alleviate effects of said at least one updated system-level-impact producing scenario; and
repeating steps of claim 19.

22. The method of claim 18, wherein said generating of said minimal cut sets comprises:
generating cut sets having a cardinality K from said annotated graph, said cardinality K being less than a total number of edges of said graph;
generating subsets of each of said cut sets by iteratively removing edges from each of said cut sets; and
determining whether each of said subsets is a cut set.

23. The method of claim 18, wherein said selecting of said collection of minimal cut sets comprises:
selecting each minimal cut set among said generated minimal cut sets one at a time;
for each selected minimal cut set, assigning a weight parameter that depends on each value of said weight assigned to edges within said selected minimal cut set; and
employing a value of said weight parameter to determine whether each minimal cut set is included within said collection.

24. The method of claim 23, wherein said employing of said value of said weight parameter comprises:
ordering all of said generated minimal cut sets in an order of a monotonically changing order of said weight parameter; and
selecting a predetermined number N_mcs of said generated minimal cut sets either from the first N_mcs number of said ordered generated minimal cut sets or from the last N_mcs number of said ordered generated minimal cut sets.

* * * * *